Jan. 10, 1939.  H. CROSS  2,143,302
BAG CONTAINING BEVERAGE MATERIAL
Filed April 13, 1938
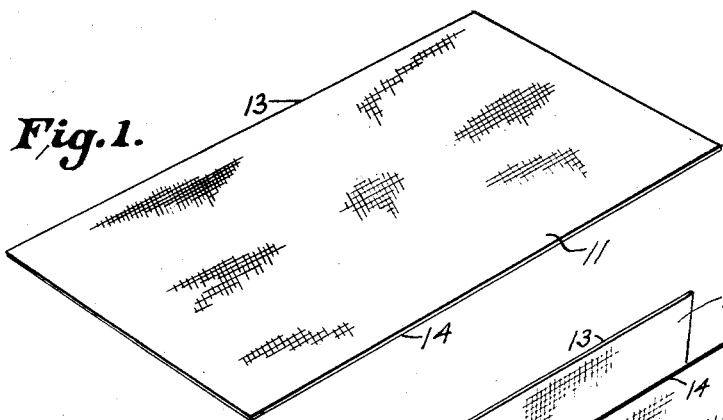
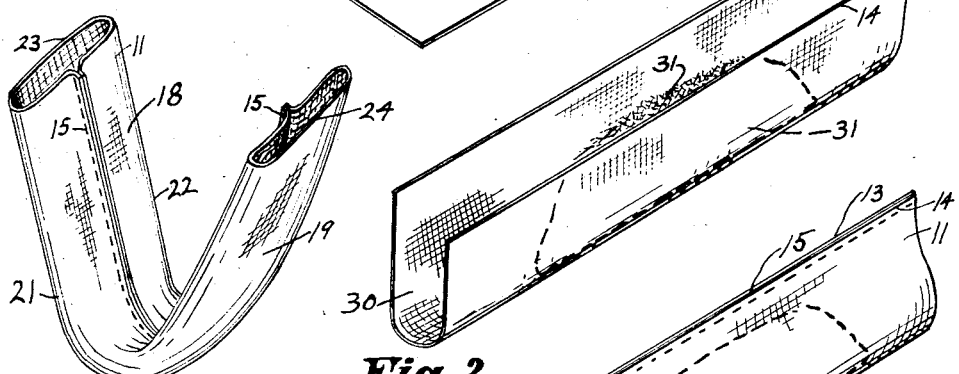
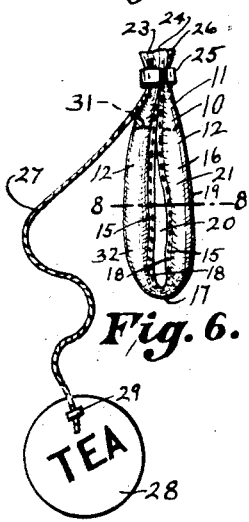
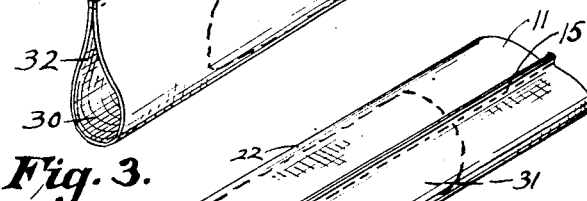
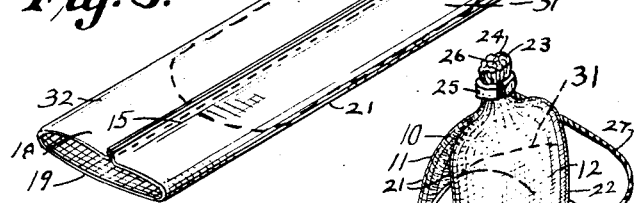
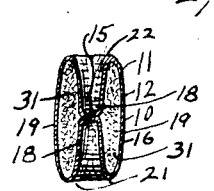
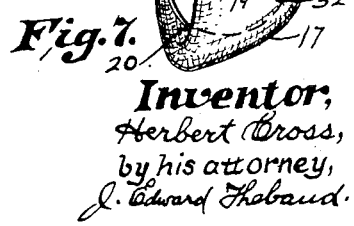
Inventor:
Herbert Cross,
by his attorney,
J. Edward Thebaud.

Patented Jan. 10, 1939

2,143,302

UNITED STATES PATENT OFFICE 2,143,302

BAG CONTAINING BEVERAGE MATERIAL

Herbert Cross, Cynwyd, Pa., assignor to Mutual Tea Packing Co. Inc., New York, N. Y., a corporation of New York Application April 13, 1938, Serial No. 201,731

4 Claims. (Cl. 99—77.1)

This invention relates to bags containing beverage material, furnished for individual infusing uses.

Small cotton bags, holding beverage material, such as tea, and having an identification tag attached by string, are commonly sold for making tea, by infusion, in hot water, in individual cups or pots. While the beverage material, in such a bag, is usually some brand of tea, other infusible material, such as coffee, spices, etc., may be made the contents of the bag, where small portions of an infusion, freshly produced in hot water, are desired.

Relative to economical and efficient considerations of importance, I have various objects in view, as to the form, distribution of the filling, as well as the tagging and making of such small bags containing beverage material, for the trade.

One of these objects is to provide an individually small, loosely woven, fabric bag, preferably of looped, tubular formation, filled with beverage material such as tea, coffee, spices, or the like, ready to be infused in a single cup or pot of hot water.

A further object of my invention is to provide a small porous bag, of the class described, having such a construction as will effect an economical use of the bag material in making the bag, and at the same time effect an economy in the use of the beverage material inside, by distributing and spreading the latter in the most advantageous ways over freely extending thin areas, of the inside, of the porous bag walls, and thus facilitate and hasten the infusing process to all parts of the bag contents.

Another object is to so form a filled bag, fulfilling the above named objects, as will facilitate a simple series of successive steps in its making, whether by hand, or automatically, by machine, and if by machine, I desire to have the bag so formed as to facilitate its manufacturing, including its filling and tagging in an automatic machine, having consideration for the possible sequence of steps, to be carried out, in automatically producing such bags, in large quantities.

With these and other objects, which will hereinafter appear, my invention resides in certain structure of such bags as fulfills the above named objects.

One embodiment of my invention is illustrated in the drawing, which includes illustrations of the bag structure in whole and in part formation as successively made. The same is hereinafter described, the steps taken in the formation of the bag are explained, and what I claim is set forth.

In the drawing,

Figure 1 illustrates in perspective view a rectangular unit blank, of loosely woven, cotton fabric, used in making the said bag.

Figure 2 illustrates, in perspective view, the said unit blank, shaped as a trough, containing a quantity of beverage material.

Figure 3 is a perspective view, similar to Figure 2, except that it shows the top edges of the filled trough sewed together, to form a tube.

Figure 4 is a perspective view of the partially formed bag, at its tubular stage of formation, having the same, with its contents, flattened, and with the longitudinal seam centrally positioned.

Figure 5 illustrates, in perspective view, the bent shaping of the partially formed bag, while in its flattened formation.

Figure 6 illustrates, in elevation, the completed and filled bag, with tag attached.

Figure 7 illustrates, in perspective view, the same bag shown in Figure 6, except that the tag is here shown tucked within the loop of the bag.

Figure 8 is a horizontal section, taken on the line 8—8, of Figure 6.

In the figures, the bag 10 is preferably formed from a single sheet, of loosely woven cotton fabric 11, shown in Figure 1, as a unit blank. This piece of fabric 11, is the wall 12 of the bag 10, and has its longitudinal edges 13 and 14, sewed together in a seam 15. The body 16, of the bag 10, is of looped formation, with a bottom bend at 17, and longitudinal and flattened sides at 18 and 19. The seam 15, adjoins the central space 20, of the body 16, and is positioned approximately central, relative to the rounded edges 21 and 22, of the flattened sides 18 and 19. The ends 23 and 24, of the respective sides 18 and 19, terminate and are gathered together, and bound within the split ring 25, to form the upper end 26, of the bag 10. This ring 25, also binds one end of a string 27, to the upper part of the bag 10. A tag 28, is attached by a fastener 29, to the lower end of the string 27.

In forming the bag 10, I start with a rectangular piece of cotton fabric 11, of suitable size and proportions; as shown in Figure 1, as a unit blank, having longitudinal edges 13 and 14. Next, I take this blank 11 and form it into a trough 30, shown in Figure 2, to be partially filled with beverage material 31. The next step, in forming the bag 10, is to sew together the longitudinal edges 13 and 14, into a seam 15, forming a tube 32, having a continuously extending, peripheral wall, of a single thickness, with beverage material 31, contained within the tube 32, as shown in Figure 3, the beverage material 31, as shown in Figure 3, within the tube. Following this last step, I flatten the tube 32, in a manner to have the seam 15 come central, with respect to the rounded edges 21 and 22, of the flattened tube 32, as shown in Figure 4, and at the time of flattening the tube 22, the beverage material becomes thinly distributed and spread over the inner surface of flattened, and approximately parallel, and closely spaced, portions of the tube walls, extending toward both ends of the tube 32, and on opposite sides of center 17. Next, I bend the flattened tube 32, at 17, midway between the tube ends 23 and 24, as shown in Figure 5. Succeeding this last bending step, I bring together the flattened tube ends 23 and 24, and tightly gather them together, placing the upper end of the string 27 within the gathered ends, then I compress, around these tube ends 23 and 24, and the upper string end, the split ring 25, binding them all together. The tag 28, is previously attached to the string 27, by the fastener 29. To hold the tag 28 from dangling at the end of the string 27, I tuck it within the space 20, between inner and adjoining portions of the flattened side 18 of the bag body 16, which inner adjoining portions are somewhat strengthened by the thin layer of beverage material within, together with the outer wall portions, of the side 19, adjoining the said inner wall portions.

The completed and filled bag 10, as above described, is ready to be soaked in a cup or pot, of hot water, for the infusion process. It will be observed that the form of the bag 10, presents one having a free and continuously extending closed wall, of a single thickness, including the respective flattened inner and outer sides 18 and 19. The flattened and comparatively thin looped body, of the beverage material affords a body thereof which is more quickly traversed by the hot water, as it passes through the uniformly thin, and unobstructed single thickness of wall 12, of the bag 10, resulting in a quicker formed and denser infusion of the beverage material.

Inasmuch as the material in the bag, by its form, is used to marked advantage in the single thickness, of adjoining wall portions thus created, free from folds or seam on the outside thereof, it is evident that no surplus material results in the formation of the filled and completed bag, and therefore an economy in the use of the fabric is obtained. Inasmuch as a slight modification of taste, of the infused tea, obtains from the use of fabric bags, the less amount of bag material actually used as needed per bag, the more natural will be the taste of the infused tea. Also it can be observed, that the flattening and positioning of the bulk of the beverage material contents of the bag 10, to effect a rapid and uniform infusion of this beverage material placed at such advantage, leaves practically none of said material in an unfavorable position for infusion, and therefore a less quantity of the said material is needed to get an infusion result comparable to that using the ordinary round bag of beverage material.

While changes in the form and method of making the filled infusion bag may be made without departing from the spirit and scope of my invention, I wish to include all such changes as come within the purview of the following claims.

I claim:

1. A beverage infusion bag, having beverage material therein, said bag including a body, having a thin fabric wall, formed as a bent, looped and flattened tube, which tube has two adjoining side portions, forming the loop thereof, each of said looped side portions having a pair of substantially parallel, adjacent, closely spaced, and flattened wall portions, with beverage material contained between said last named, flattened, wall portions, the wall of said tube being continuously extending, and also being of a single thickness in cross section, whereby, during the infusion process, water freely passes through the said continuously extending wall, of single thickness, in and out of the beverage held between the closely spaced wall portions of each of the said pairs thereof.

2. A bag made in accordance with claim 1, having in addition thereto, clamping means for holding the ends of said tube gathered together.

3. A bag made in accordance with claim 1, having in addition thereto clamping means for holding ends of said tube gathered together, a string attached at one end to said bag, by said clamping means, and a tag fixed to the other end of said string, said pairs of adjoining, looped portions, affording by their proximity, supporting means, for releasably holding said tag therebetween.

4. A beverage infusion bag having beverage material therein, said bag comprising a sheet of loosely woven fabric material, a seam joining opposite, longitudinal edges of said sheet to form a tube, said tube and its contents being flattened and bent into a looped body, with said seam positioned within the loop thereof, said loop having two adjoining side body portions, and each of said adjoining, side body portions having a pair of substantially parallel, adjacent, closely spaced and flattened wall portions, with beverage material spread between said wall portions, the wall of said bag being continuously extending, and also being of a single thickness in cross section, whereby, during the infusion process, water freely passes through the said continuously extending wall, of single thickness, in and out of the beverage material held between the closely spaced wall portions, of each of the said pairs of looped, side portions.

HERBERT CROSS.